Patented Dec. 29, 1953

2,664,350

UNITED STATES PATENT OFFICE 2,664,350

SEED GERMINATION

William J. Hale and Phelps Vogelsang, Midland, Mich., assignors, by mesne assignments, to Verdurin Company, Detroit, Mich., a corporation of Michigan No Drawing. Application March 20, 1945, Serial No. 583,844

4 Claims. (Cl. 71—1)

This invention relates to improvements in seed germination, more particularly to a method of augmenting the sprouting of seeds, bulbs and roots and stimulating early plant growth.

There is present in seeds and bulbs a trace of chlorophyll, or other forms of porphyrin, as evidenced by green coloration, and a trace of carotenoids, as indicated by yellow to red coloration. Though this small quantity of chlorophyll is sufficient to initiate germination even at the loss of oxygen under normal breathing, actual early growth is essentially dependent upon supplies brought in by the rootlets. These latter secure organic matter and carbon dioxide from the surrounding humus. In a short time, therefore, the plant, after emergence, is able to develop sufficient chlorophyll for transfer to the leaves where, henceforth, it replenishes itself and engages in carbohydrate synthesis direct from the air.

It is apparent, therefore, that any substantial increase in the supply of available chlorophyll in close juxtaposition to seeds and bulbs might well contribute to a speedier and more vigorous early growth of plants. Experiments confirm this hypothesis. If, however, the chlorophyll is applied in water soluble form directly to the seed there occurs a general stoppage of the interstices and interference with normal breathing with resultant retardation of growth. This is due largely to the solubly fatty acids that accompany chlorophyllin. In normal plant metabolism such retardation is avoided because of simple esterification of porphyrins. Furthermore, these insoluble esters are quite stable and remain so until solubilized by the action of enzymes within the roots of plants, whereupon, in their turn, these solubilized porphyrins are transported to the leaves and again esterified that they may be held within the chloroplasts of said leaves.

In carrying out the invention it is preferred to use the crudest extract obtainable directly from green leaves; an extract more or less insoluble in water which closely simulates or approximates nature's own compounding. This composite is known to contain chlorophylls, carotenes, xanthophylls, flavones, sterols, fats, waxes and enzymes, and has been termed the "chlorophyll-carotenoid complex"; in brief, it comprises all there is of the leaf save cellulose and lignin and inorganic skeletal structure. A newer term and most appropriate for the composition is that of "Verdurin" which signifies the active principles of verdure.

The effectiveness of the application of crude chlorophyll-carotenoid complex, or verdurin, on growing plants is well illustrated in the discing of a grass plot. Within a day or two following said operation, whereby long grass blades rich in chlorophyll are forced beneath the surface, there is observed a most luxurious growth of the grass remaining intact as well also as a brighter green hue to the same. On the other hand, the mere drilling in of chlorophyll-free sawdust on a grass plot, even though increasing its aeration, is followed by little or no effect on the color or growth of the grass. It may be assumed, therefore, that it is the crude composite of verdurin within grass and plants in general, that exerts the greatest promotive action on plant growth.

Verdurin may be employed in an alcoholic or acetone solution, in a water suspension and even in an oil solution. Under certain conditions such crude chlorophyll complex may be applied in water-soluble form. A preferred procedure is the simple but irregular spraying of seeds and bulbs with a very dilute spray, so constituted as to prevent the formation of a continuous film or membrane on the seed after drying of the spray. A better procedure involves the rotating of seeds in a drum into which is sprayed a solution or suspension of the chlorophyll-carotenoid complex with some water soluble binding media, such as solutions of methyl cellulose, sodium alginate and the like (which latter serve as carriers for fungicides and fertilizers) and at the same time introducing, little by little, a measured quantity of finely powdered feldspar, bentonite, fly ash and similar material. The resulting pellets, each enclosing a seed, are now capable of breaking apart in the soil through action of soil moisture on the hydrophyllic binder to insure better germination and growth for each seed. It is in this preferred procedure that we find the water soluble chlorophyllins of highest merit; a fact probably due to the greater dispersion of water soluble compounds throughout the pelleting crust without necessarily choking the pores and seed envelope.

It has been proposed heretofore to coat seeds with binding materials such as starch or sugar, which binding material serves as a carrier for fertilizers, fungicides, growth stimulating hormones and the like. However, the concept of accelerating germination and insuring vigorous growth by making beneficial chlorophyll derivatives available to the seed does not appear in the art.

In the practice of the invention, scarcely more than a mere trace of verdurin is likely to be in actual contact with the seed hull. Nevertheless the verdurin is in excellent position to supply the rootlets with their needed ingredients to augment plant growth.

When the soluble form of chlorophyll is involved, i. e., a chlorophyllide or a chlorophyllin, we have discovered that the magnesium atom complex may advantageously be replaced by an iron atom or even a copper atom to yield a more specifically adaptable plant growth stimulant.

Concentration of the verdurin per weight of seed may vary markedly. Based on the actual chlorophyll content of the verdurin it is desirable that at least 100 parts of chlorophyll per million of seed be employed; preferably we have employed 200 parts of sodium iron chlorophyllin per million of seed as a standard, and, as a rule, anything over 1000 parts per million ($\frac{1}{10}$th of 1%) is an unnecessary excess.

No particular emphasis can be placed on the presence of the accompanying carotenoids in the verdurin save that of stabilizing the chlorophylls; whatever other function they perform remains as yet unraveled.

As will be appreciated the metal complexes capable of formation from porphyrins comprise a larger group, all of which, especially among those of hemin, phyllin and phorbin structures, are capable of existing in water soluble state. Thus, by selecting one or more of these metal complex water soluble porphyrin compounds we are able to supply to a particular seed or bulb just what proper trace metal or mixture of metals that experiment has proven to be most necessary for its growth. Among the metals that can be made to combine with the porphyrin molecule are the following: lithium, sodium, potassium, rubidium, cesium and magnesium; mercury, thallium, lead and tin; and iron, cobalt, nickel, copper, silver, zinc, manganese and gold.

When, for example, the problem is concerned with sprouting of tung nuts it will be found most beneficial to employ a zinc complex porphyrin as growth promoter. In the case of potato tubers an application of both magnesium and iron complex porphyrins is found highly beneficial. In those circumstances where a hemin structure is desirable it may be used in the form of readily commercially available oxblood.

In a study of chlorophyll and chlorophyll-carotenoid impregnated seed shells the usual procedures contributing to better germination conditions applicable to most seeds have been followed. Thus, as will be seen, there may be incorporated in the pelleting composition such constituents as fertilizing materials, such as superphosphates, potash salts and available nitrogen compounds, fungicides such as suitable mercurials (Semesan-Bell), growth stimulants such as phenyl barbituric acid, plant hormones and the like.

The efficacy of the described procedures may be more readily appreciated and evaluated from a consideration of the following examples.

EXAMPLE I

Tomato seeds were thoroughly mixed with a quantity of moistened starch in which was incorporated 0.1% of chlorophyll-carotenoid complex until a unit of about the size of a pea was formed and the coated seeds were planted in seed pots in a greenhouse. Whereas control planting with untreated seeds displayed emergence in 14 days, the treated seeds showed emergence in 11 days and with considerably stouter stalks.

EXAMPLE II

Example I was repeated, phenyl barbituric acid was added to the starchy mass in the proportion of 400 parts per million of the seed. Emergence of the treated tomato seeds occurred in 10 days.

EXAMPLE III

A quantity of sugar beet seed was whirled in a drum while being sprayed with an aqueous solution of 5% dimethyl cellulose. Simultaneously a stream of powdered feldspar of approximately 300 mesh was slowly fed to the drum and agitation was continued until each seed built up to a pellet of approximately ¼ inch in diameter. During the pelleting operation there was fed into the drum a quantity of the mercury fungicide, 'Semesan-Bell" amounting to about 2% of the weight of the seed and superphosphate equivalent to about 5% of the weight of the seed.

EXAMPLE IV

Example III was repeated except that phenyl barbituric acid was added during pelleting to the extent of 400 parts per million parts of seed.

EXAMPLE V

Example III was similarly repeated except that sodium iron chlorophyllin was added during pelleting to the extent of 200 parts per million parts of seed.

EXAMPLE VI

Example IV was repeated with the addition of sodium iron chlorophyllin during pelleting to the amount of 200 parts per million parts of seed.

EXAMPLE VII

Example VI was repeated raising the amount of the sodium iron chlorophyllin to 400 parts per million parts of seed.

EXAMPLE VIII

Example IV was repeated except that sodium copper chlorophyllin was added during pelleting to the extent of 200 parts per million parts of seed.

In these operations on sugar beet seeds it was ascertained that about 10% of the seeds were injured in breaking up the seed clusters, hence 45 may be considered a perfect germination score.

The results of these tests are tabulated below:

*Tabulation of sugar beet germination and emergence in trays indoors at room temperatures*

| Emergence sugar beet plant out of 50 seeds | On 7th day | On 8th day | On 9th day | On 10th day |
|---|---|---|---|---|
| The seed alone as check | 11 | 2 | 21 | 25 | 26 |
| Example III | 33 | 10 | 14 | | 23 |
| Example IV | 35 | 3 | | 23 | 25 |
| Example V | 38 | 16 | 23 | | 29 |
| Example VI | 43 | 5 | 29 | 38 | 43 |
| Example VII | 39 | 7 | 24 | 34 | 39 |
| Example VIII | 43 | 5 | 27 | 39 | 43 |

It will be observed from an inspection of the above tabulation that the effect of chlorophyll on, for example, sugar beet germination is very marked. The germination is considerably accelerated, by about several days and emergence is practically complete in 10 day period. This is striking when it is considered that when using control or untreated seed about 14 days are required for equivalent emergence. It is also observed that the plants grown from the pelleted seeds are characterized by a thicker and generally stronger structure.

It has been found that the novel method of improving the germination of seeds and generally inducing accelerated and improved plant growth is not limited to any particular seeds but is of broad and general application as is evidenced by the effect of pelletizing alfalfa seeds.

EXAMPLE IX

Alfalfa seeds were whirled in a drum while being sprayed with an aqueous 8% dimethyl cellulose solution and while being contacted with a stream of powdered feldspar of about 300 mesh. The operation was controlled to build up each seed to a pellet of about $\frac{3}{16}$ inch in diameter. During the pelleting there was continuously sprayed on the seeds 2% of Semesan-Bell and 5% of superphosphate together with about 200 parts per million of sodium iron chlorophyllin.

Planting test showed that 67 out of each 100 pelleted alfalfa seed emerged in 19 days whereas control (unpelleted) seed showed an emergence of only 37 out of 100 seeds in the same number of days.

It will be appreciated that the invention comprehends broadly the concept of intimately associating growth stimulating chlorophyll derivatives with the seed. While a wide variety of inert material may be utilized as carrier vehicles for the chlorophyll, and other growth stimulating material it is preferred to employ hydrophyllic substances capable of some degree of film formation. The ability to dissolve or disperse such film forming material in aqueous media provides an easy means of applying the desired amount of the hydrophyllic material as an encasement on the seed. While starch and dimethyl cellulose have been described as effective carrier vehicles it will be appreciated that other hydrophyllic colloids may be utilized such as inulin, dextrins, polyvinyl alcohol and such compounds as sodium alginate, arabin and the like. This group may be characterized generally as cold water soluble, film forming polymeric polyhydroxyl compounds alone, partially etherified with lower alkyls and alkali salt forms of the same wherever carboxylic groups appear.

In lieu of feldspar other inert finely divided material may be employed for the same function, namely, to extenuate the film forming binder and to prevent too adherent and impermeable a plastic encasement of the seeds. The respective percentages of the film forming binder and the inert filler may be varied to adapt the pelleted seed to the particular soil conditions. Similarly, the thickness of the encasement or shell may be varied to correlate the pelleted seed with the moisture characteristics of the soil.

While preferred embodiments of the invention have been described it is to be understood that these are given didactically to illustrate the underlying principles involved and not as limiting the useful scope of the invention to the particular illustrative embodiments.

We claim:

1. A method of improving the growth of seeds, roots and bulbs which comprises, applying to the surface of the seeds, roots and bulbs an adherent but slowly water soluble plastic mass which contains an inert filler and a water soluble metallo-porphyrin complex homogeneously distributed therethrough.

2. A method of improving the germination of seeds, roots and bulbs which comprises encasing such seeds, roots and bulbs with an inert carrier material containing sodium iron chlorophyllin and a water soluble plastic binder.

3. A method of improving the germination of seeds, roots and bulbs which comprises encasing such seeds, roots and bulbs with an inert carrier material containing sodium iron chlorophyllin and methyl cellulose.

4. A method of improving the germination of seeds, roots and bulbs which comprises encasing such seeds, roots and bulbs with an inert carrier material containing sodium copper chlorophyllin and a water soluble plastic binder.

WILLIAM J. HALE.
PHELPS VOGELSANG.

References Cited in the file of this patent

UNITED STATES PATENTS

| Number | Name | Date |
|---|---|---|
| 1,568,445 | Diller | Jan. 5, 1926 |
| 2,083,065 | Heyl | June 8, 1937 |
| 2,098,110 | Schertz | Nov. 2, 1937 |
| 2,205,807 | Bjorksten | June 25, 1940 |
| 2,313,057 | Fischer | Mar. 9, 1943 |

FOREIGN PATENTS

| Number | Country | Date |
|---|---|---|
| 492,596 | Great Britain | Sept. 19, 1938 |
| 11,758 | Great Britain | O. G. 1847 |
| 759,014 | France | Nov. 7, 1933 |
| 411,040 | Germany | Mar. 24, 1925 |
| 506,731 | Germany | Sept. 8, 1930 |
| 508,520 | Germany | Sept. 27, 1930 |

OTHER REFERENCES

Serial No. 310,759, Alberizzi Ernesto (A. P. C.), published May 4, 1942.

Hackh's Chemical Dictionary, 3rd Ed., 1944 (pages 194, 195, 379, 402, 403, 674, 675).